United States Patent
Manner et al.

(10) Patent No.: US 7,146,165 B2
(45) Date of Patent: Dec. 5, 2006

(54) METHOD AND SYSTEM FOR FILE MANAGEMENT IN A MOBILE NETWORK

(75) Inventors: Juha-Pekka Manner, deceased, late of Helsinki (FI); by Anja Sisko Manner, legal representative, Helsinki (FI); Paavo Juhani Manner, Helsinki (FI)

(73) Assignee: Smarttrust AB, Stockholm (SE)

( * ) Notice: Subject to any disclaimer, the term of this patent is extended or adjusted under 35 U.S.C. 154(b) by 32 days.

(21) Appl. No.: 10/536,949

(22) PCT Filed: Nov. 28, 2003

(86) PCT No.: PCT/SE03/01856

§ 371 (c)(1),
(2), (4) Date: May 31, 2005

(87) PCT Pub. No.: WO2004/052034

PCT Pub. Date: Jun. 17, 2004

(65) Prior Publication Data

US 2006/0058024 A1   Mar. 16, 2006

(30) Foreign Application Priority Data

Dec. 3, 2002   (SE) .................................. 0203603

(51) Int. Cl.
*H04Q 7/20* (2006.01)
(52) U.S. Cl. .................................... 455/432.3; 455/406
(58) Field of Classification Search ................ 455/406, 455/466, 557, 558, 551, 563, 411, 556.2, 455/50.1, 432.3
See application file for complete search history.

(56) References Cited

FOREIGN PATENT DOCUMENTS

| GB | WO217652 | * | 8/2001 |
|----|----------|---|--------|
| GB | WO02071219 | * | 3/2002 |

* cited by examiner

*Primary Examiner*—Melody Mehrpour
(74) *Attorney, Agent, or Firm*—Rolf Fasth

(57) ABSTRACT

The invention is concerned with a system for file management in a mobile network. The network has one or more mobile terminals having a memory with saved file information and a central database containing information to be updated. The system has means for requesting a change in the files of the mobile terminal(s) and means for updating new information in the files of the mobile terminal(s). A request for a change to be made in the files of the mobile terminal is sent to the central database which updates its information on the basis of the request. The new information is then sent from the central database to the files of the defined mobile terminals.

11 Claims, 5 Drawing Sheets

| Identifier:'6F3A' | Structure: Linear fixed | Optional |
|---|---|---|
| Record length: X+14 bytes | | Update activity |
| Access conditions:<br>READ        CHV1<br>UPDATE     CHV1<br>INVALIDATE  CHV2<br>REHABILITATE CHV2 | | |

| Bytes | Description | M/O | Length |
|---|---|---|---|
| 1 to X | Alpha Identifier | O | X bytes |
| X + 1 | Length of BCD number/SSC content | M | 1 byte |
| X + 2 | TON and NPI | M | 1 byte |
| X+3 to X+12 | Dialling Number/SSC string | M | 10 bytes |
| X + 13 | Capability/Configuration Identifier | M | 1 byte |
| X + 14 | Extension 1 Record Identifier | M | 1 byte |

FIG. 1

METHOD AND SYSTEM FOR FILE MANAGEMENT IN A MOBILE NETWORK

PRIOR APPLICATIONS

This is a U.S. national phase patent application that claims priority from PCT/SE2003/001856, filed 28 Nov. 2003, that claims priority from Swedish Patent Application No. 0203603-6, filed 3 Dec. 2002.

TECHNICAL FIELD

The invention is concerned with a method and system for file management in a mobile network, especially for updating SIM files.

BACKGROUND ART

The Global System for Mobile Communication (GSM) is a standard for digital wireless communications. GSM has much more services than just voice telephony. Additional services allow nowadays a great flexibility in where and when GSM phones are used. Today's second-generation GSM networks deliver high quality and secure mobile voice and data services (such as SMS/Text Messaging) with full roaming capabilities across the world.

The development of GSM Networks and terminals to support more advanced data bearer technologies has allowed for the introduction of new exciting data services. These technologies allow for a greater bandwidth and more capable execution environment, so permitting for the development of mobile applications. The world has become increasingly computer centric and computer applications are now used for a number of tasks such as communications, financial management, information retrieval, entertainment and game playing. It is a natural progression for the user to expect these applications to be available to them on their mobile terminal.

More information about GSM services can be found on http://www.gsmworld.com/technology/applications/.

In mobile networks people can be contacted by calling to their mobile telephone number or by sending to that number a so called short message by e.g. making use of the Short Message Service (SMS). The point-to-point Short message service (SMS) provides a means of sending messages of limited size to and from GSM mobiles. Detailed information can be found in the ETSI standard GSM 03.40 Version 5.3.0.

The Subscriber Identity Module (SIM) inside GSM phones is a smart chip that was originally designed as a secure way to connect individual subscribers to the network. There is an on-going evolution of the SIM into a standardized and secure application platform for GSM and next generation networks.

ETSI (the European Telecommunications Standards Institute) is a not-for-profit organization whose mission is to produce the telecommunications standards for use throughout Europe and beyond. The ETSI TS 100 977 V8.2.0 (2000-05) standard describes the interface between the SIM and the Mobile Equipment (ME) within the digital cellular telecommunications system.

The logical structure of files in SIM is hierarchical and there are three types of files, i.e. Elementary Files (EF), Dedicated Files (DF) and Master Files (MF), the last mentioned ones being highest in the hierarchy.

$EF_{ADN}$ is an elementary file containing Abbreviated Dialing Numbers (ADN) and/or Supplementary Service Control Strings (SSC). In addition, it contains identifiers of associated network/bearer capabilities and identifiers of extension records. It may also contain an associated alpha-tagging.

The $EF_{ADN}$ file is colloquially called the "phone book" file since the mobile phone user use it for fetching the right telephone number by name when trying to contact someone by calling or sending an SMS.

There are often difficulties in the communication as contact cannot be established due to unavailable or wrong contact information, absent people or the contact is tried to establish at a totally wrong occasion.

SyncML, described in http://www.syncml.org/technology.html is one attempt to try to solve this problem. It defines databases for synchronizing central database information with information on users' devices and vice versa. The SyncML solution, however, requires mobile terminals that support the SyncML protocol, which is a disadvantage, since most mobile stations do not have this support yet.

THE OBJECT OF THE INVENTION

The object of this invention is a system and a method with which the above problems are solved by using existing networks for presenting up-to-date contact information.

SUMMARY OF THE INVENTION

The system of the invention for file management in a mobile network, comprising One or more mobile terminals having a memory with saved file information and a central database containing information to be updated, is mainly characterized in that the system comprises means for requesting a change in the files of the mobile terminal(s), and means for updating new information in the files of the mobile terminal(s).

In the method of the invention a request for a change to be made in the files of the mobile terminal is sent to the central database, which updates its information on the basis of said request. The new information is then sent from the central database to the files of defined mobile terminals.

The central database has information about to which mobile terminals the new information shall be sent.

The file information in the invention consists of contact information, which is used as a phone book, but in addition to the ordinary phone book information in the $EF_{ADN}$ file, the contact information in the invention further comprises additional information such as e.g. information about if a given person is busy, in a meeting, in or out of the office, free to call to, at home etc. It could even include the e-mail address, the fax number or other such additional information. The information and technical implementation could vary according to application and the purpose in which the invention is used.

For company use, the implementation could be to connect the company's physical access control system to the contact information in the mobile phone. Many companies have an access control system, which is used to register when people are coming in and going out. The access control system can in the invention be connected to the file information on SIM (the "phonebook") having an interface working as said means for requesting a change in the phonebook in real time in order to update phonebook data. In the central database, there is an internal database containing phonebooks of SIMs, which are thus updated whenever certain data in the central database phonebook changes. Information about whether a person is in the office or not could then be available in the phone book of the mobile terminal of selected persons at any time. Similarly, calendar or location information could be integrated with the phonebook.

Said interface for the updating data on SIMs is in practice to the GSM network. This interface, which is an SMS gateway, can also be provided by the operator. In such a configuration, the SMS gateway can support central phonebooks of e.g. many companies.

A further implementation possibility is to make it possible for users to update their whereabouts by means of a service on their mobile terminal, e.g. for not being contacted during a concert or an important customer meeting. With a mobile service, the users could also Inform the time when they are available or any other information they would like to tell the calling party. Such a service would be useful not only for companies but also for other subscribers. Children for example, could have a service on their mobile phone, with which they can inform their whereabouts to their parents. The mobile terminal can thus work as a notice board at home.

The advanced phonebook services provided by the invention can make the way people communicate more efficient. Before contacting anyone people can check the preferred communication method, and whether the person is present or not. Users will see the latest contact information whenever trying to contact someone with the mobile phone. Codes can be used instead of text for making the contact information easily readable on a mobile phone, e.g. the code "+" could be used for a person, who is present, and the code "−" for a person who is absent.

Phonebooks on the SIMs can in this way contain the newest information. Whenever a user selects a person to be contacted he/she will see not only the name and phone number but also additional contact information.

The invention can easily be implemented in existing mobile terminals and e.g. GSM standards without the need for special protocols. Thus, it can be used in all GSM phones. In the invention, the technical limitations of existing mobile phones, as well as of the communication channels have been taken into consideration making commercial application instantly feasible.

A possible problem with the Invention might be a very heavy traffic flow to a given mobile phone, if SIM file updates take place often. In some embodiments of the invention, it is, therefore possible to restrict the number of updates by e.g. restricting them to given persons only, or given time periods, such as for the time of a very busy project, or to interrupt the service during vacations, travels, weekends etc.

In the following, the invention will be described by means of some exemplified embodiments to the details of which the invention is not restricted.

FIGURES

FIG. 1 is a presentation of the standardized Elementary File (EF) in the Subscriber Identity Module (SIM) containing Abbreviated Dialing Numbers (ADN) and/or Supplementary Service Control strings (SSC)

DETAILED DESCRIPTION

Figure 2:
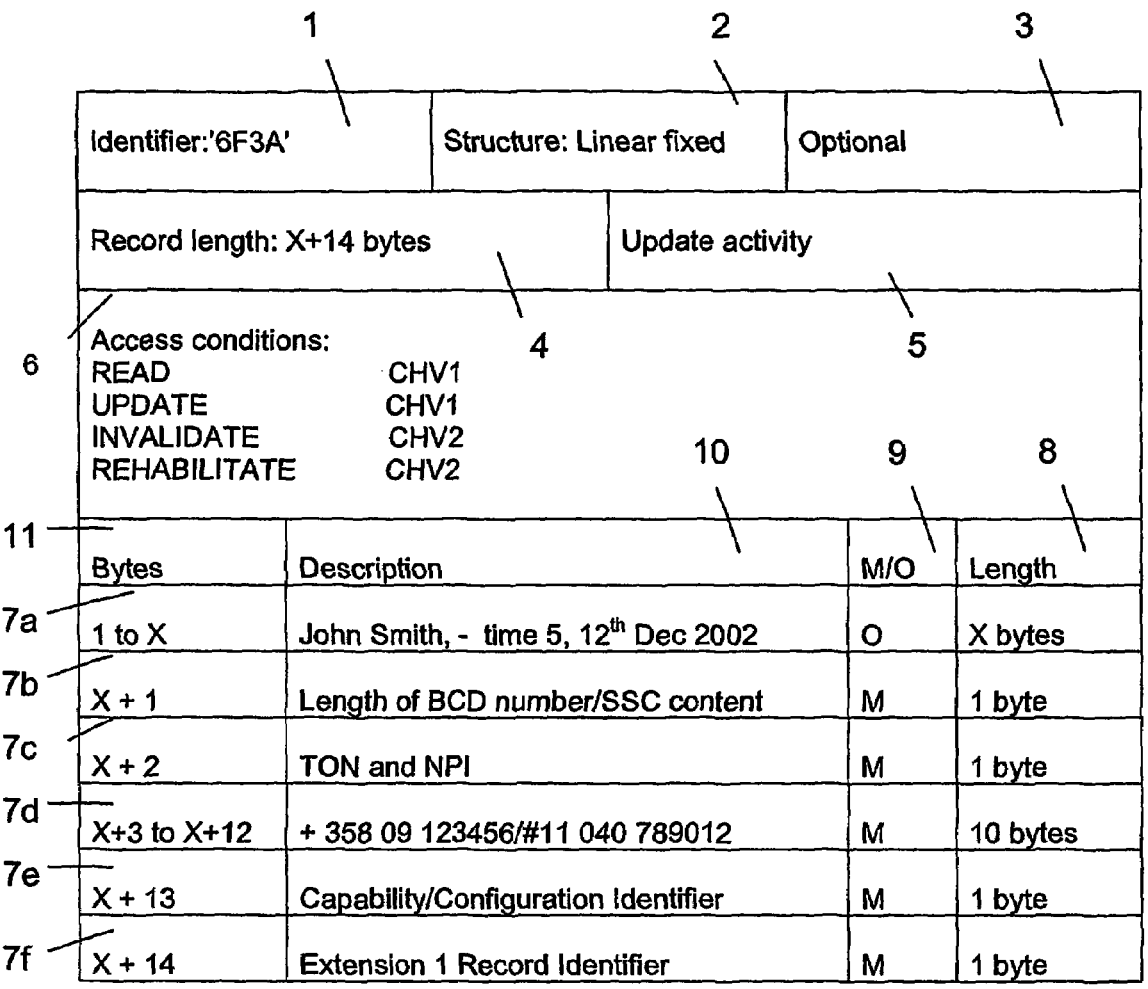
FIG. 2 is an example of an embodiment of the invention implemented in the standardized $EF_{ADN}$ of FIG. 1

FIG. 1 is a presentation of a standardized Elementary File (EF) in the Subscriber Identity Module (SIM) for a GSM session.

The ETSI TS 100 977 V8.2.0 (2000–05) standard defines the requirements for the physical characteristics of the SIM, the electrical signals and the transmission protocols, the model for the logical structure of SIM, the security features, the interface functions, the commands, the application protocol and the contents of the files required for the GSM applications.

The logical structure of files in SIM is hierarchical and there are three types of files, i.e. Elementary Files (EF), Dedicated Files (DF) and Master Files (MF), the last mentioned ones being highest in the hierarchy. The files are administrative or application specific. They contain a header part and, with respect to the elementary files, also a body part containing data. A file ID used to identify each file consists of two bytes and shall be coded in hexadecimal notation. The type of the file is identified by the first byte, and for example "6F" means that it is an elementary file under the $1^{st}$ level Dedicated File.

The Elementary Files (EF) for the GSM session defining access conditions, data items and coding. A data Item is a part of an EF, which represents a complete logical entity, e.g. the alpha tag in an $EF_{ADN}$ record. EFs are mandatory (M) or optional (O). The file size of an optional EF may be zero. All EFs with a file size greater than zero shall contain all mandatory items.

$EF_{ADN}$ is an elementary file containing Abbreviated Dialing Numbers (ADN) and/or Supplementary Service Control strings (SSC). In addition it contains identifiers of associated network/bearer capabilities and identifiers of extension records. It may also contain an associated alpha-tagging.

The $EF_{ADN}$ file is colloquially called the "phone book" file since the mobile phone user use it for fetching the right telephone number by name when trying to contact someone by calling or sending an SMS.

With respect to Elementary Files, three different structures are used, namely EFs with a transparent structure, linear fixed EFs and cyclic EFs.

An EF with a linear fixed structure consists of a sequence of records all having the same (fixed) length. The length of a record, as well as this value multiplied by the number of records, are indicated in the header field of the EF. The maximum length of an $EF_{ADN}$ file is according to the field represented in FIG. 1 by reference number 4, X+14 bytes, each byte consisting of 8 bits.

FIG. 1 also defines the access conditions, data items and coding of an $EF_{ADN}$. A data item is a part of an EF, which represents a complete logical entity. In FIG. 1, the data items of the Elementary File, $EF_{ADN}$, are described by means of a field presentation. Thus field 1 is the identifier of a given SIM file, i.e. describes what SIM file it is question about, which in FIG. 1 is the $EF_{ADN}$ file coded as 6F3A and shown by reference number 1 in FIG. 1.

The field represented by reference number 2 shows that the file is a linear fixed EF file. According to the field represented by reference number 3, the $EF_{ADN}$ file is optional and the length of it may thus be zero. All EFs with a file size greater than zero shall contain all mandatory data items.

The field represented by reference number 5 indicates that the file can be updated.

Every file has its own specific access condition for each command. There are different access condition levels, such as Always (=The action can be performed without any restriction), Card Holder Verification 1 (CHV1) and Card Holder Verification 2 (CHV2) (=The action is possible if a correct CHV1/CHV2 value already has been presented to SIM during the current session, the CHV1/CHV2 enabled/disabled indicator is set to "disabled" or unblock CHV1/CHV2 has been successfully performed during the current session), ADM (=Allocation of these levels and the respective requirements for their fulfillment are the responsibility of the appropriate administrative authority) and Never (=The action cannot be performed over the SIM/ME interface, but the SIM may perform the action internally).

Different functions may act on the files on a SIM. It is mandatory for all SIM cards in accordance with standard ETSI TS 100 977 V8.2.0 (2000–05) to support the functions Select, Status, Read Binary, Update Binary, Read Record, Update Record, Seek, Increase, Invalidate and Rehabilitate.

As appears in FIG. 1, field 6, the functions Read (Record), Update (Record), Invalidate and Rehabilitate can be performed on the $EF_{ADN}$ file, the functions having the access conditions CHV1, CHV1, CHV2 and CHV2, respectively. For example the Read Record function can only be performed if the READ access condition for this EF is satisfied and so on with respect to the other functions.

Each record consists of a row of data items represented by fields 7a–7f, the maximum length of each data item being indicated in column 8, the sum of which is X+14 bytes. Column 9 indicates whether the field is optional or mandatory, column 10 describes the data item information included in each row and column 11 defines the order of each data item in one row.

Thus, each row contains as its first item an alpha identifier (indicated in field 7a in FIG. 1) according to column 10, such as a name associated with a given Abbreviated Dialing Number (ADN) indicated in field 7d. Field 7d can also contain a Supplementary Service Control string (SSC) consisting of e.g. a character string for an abbreviated transfer call code. Column 8 indicates the length of field 7a to be X bytes, column 9 that this data item is optional. Column 11 tells that this data item is the first item in a row represented by the X first bytes. The value of X maybe from zero to 241 and depends on the settings in the individual mobile terminals.

The second data item described in field 7b informs the coding method, i.e. length of the BCD (Binary Coded Decimal) number and possible SSC content. Field 7c describes the type of number (TON) and numbering plan identification (NPI). Field 7d presents the dialing number associated with the alpha identifier in field 7a or a possible transfer code for transferring the call to another number. Field 7e presents the capability/configuration identifier containing associated capability/configuration parameters required for the call, and field 7f is an extension 1 record identifier containing an associated called party subaddress or additional data.

According to column 9, all data items 7b–7f except the alpha identifier 7a are mandatory. In the invention it has found out that the alpha identifier field 7a gives the possibility to add additional information in it.

FIG. 2 shows an example of an embodiment of the SIM card of the invention, wherein additional information has been included in the alpha identifier field 7a of the $EF_{ADN}$ file. The content of the fields represented by reference numbers 1–6 and 7b–7f remain intact in the invention compared to the standard $EF_{ADN}$ file.

Field 7a indicates that this is John Smith's telephone number, and minus (–) indicates that he is not available for the time being and will be so until the time and date indicated, here 5 o'clock, $12^{th}$ Dec., 2002. Of course other information can be informed and other ways to code than the minus (–) for absent in the example above.

Figure 3:
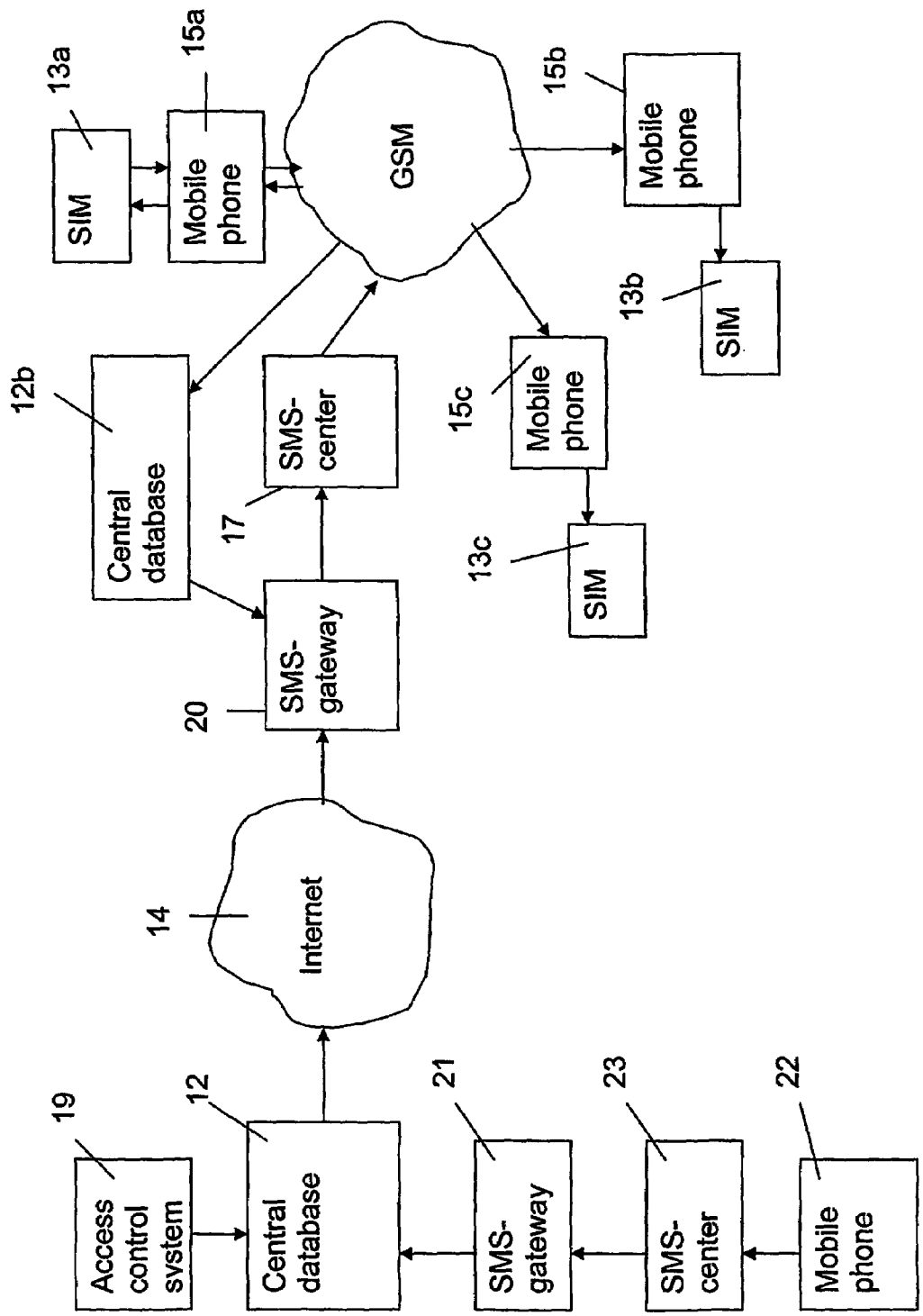
FIG. 3 is an architecture view of a network in which the invention can be implemented

FIG. 3 is an architecture view of a network in which the invention can be implemented. When in the invention data in a central data base 12 phone book is updated, the updated information is forwarded to pre-selected SIM phone books 13a, 13b and 13c and updated there, too. Information about to which mobile terminals the updated information shall be forwarded to is in the central database 12. In the updating, standardized SIM toolkit commands for Remote File Management can be used (ETSI TS 101 181 V 8.3.0 (2000–08)).

The central data base 12 containing phone book data can be e.g. a company's internal data base which is integrated with the phone book of the mobile phones of the persons working in the company. The central data base can in the invention also be the operators data base 12b containing the phone book data of all subscribers or defined groups of subscribers.

The message from the central database 12 to the SIMs 13a, 13b and 13c are forwarded through a public network, such as Internet 14 with the TCP/IP protocol used in Internet. So that the message could be forwarded to the SIMs 13a, 13b and 13c of the mobile phones 15a, 15b and 15c respectively via the GSM network 16 it goes via an SMS-center 17, wherein the message is converted to an SMS message using the SS7 protocol. The SMS gateway 20 is technically an optional component but in practice it is used by many operators for administrative purposes for e.g. charging, routing and access control purposes.

The requests to the central database 12 for updating phone book information can come from e.g. a company's physical access control system 19 or via an SMS gateway 21 and SMS-center 23 from an employee's mobile phone 22. The SMS gateway 21 converts the message from the mobile phone 22 into the TCP/IP protocol so that it can be received by the central database 12.

The requests to the central database 12b can come directly from any mobile phone (from 15a in FIG. 3) in the GSM network but are updated by the central database 12b, which has the access information about who is entitled to send such messages and which has the information about to which mobile phones 15a, 15b and 15c and further to the SIMs 13a, 13b and 13c the updating information shall be sent. The signals performing the updating are explained in connection with FIGS. 4 and 5.

Figure 4:
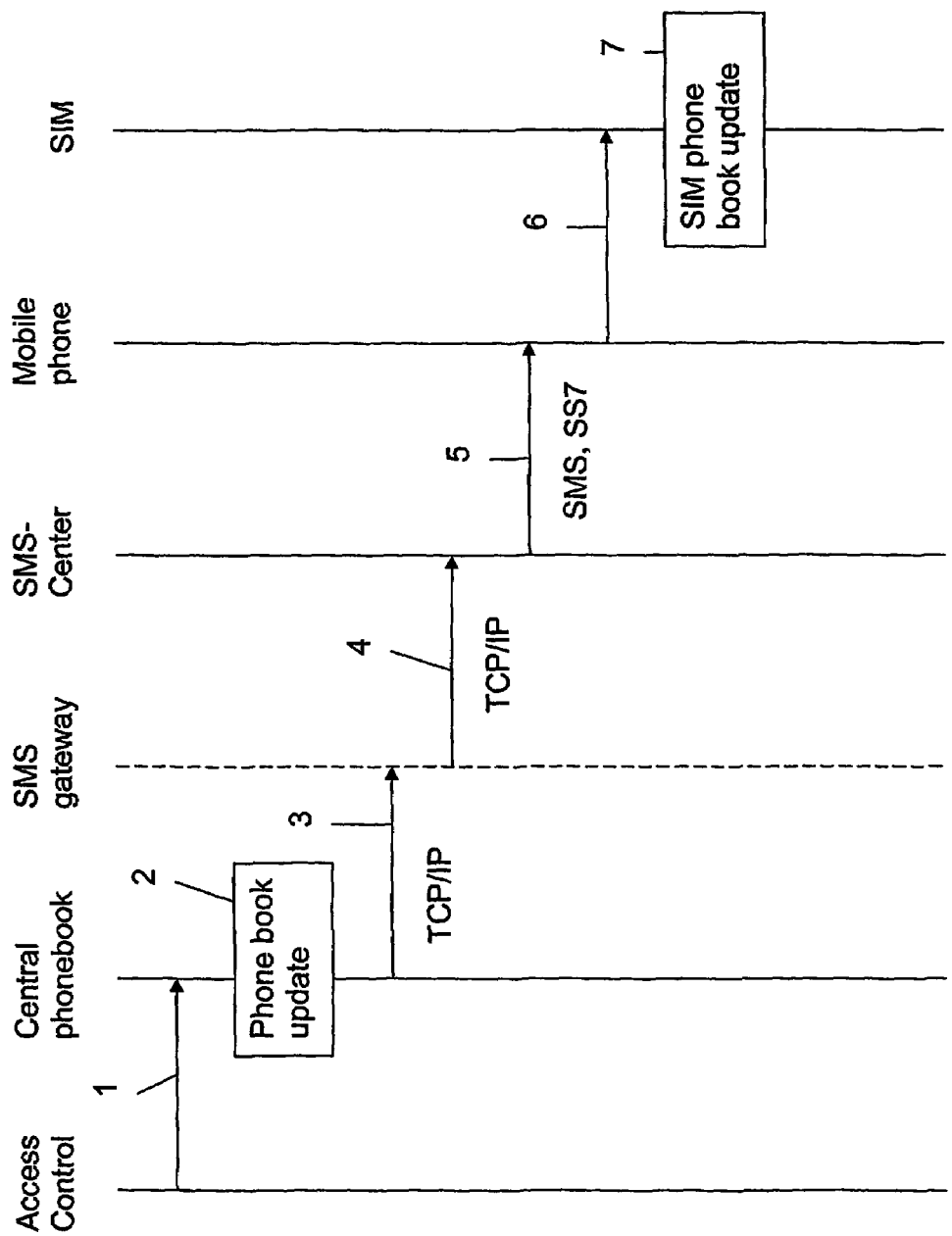
FIG. 4 is a signaling diagram of a first embodiment of the method of the invention

FIG. 4 presents an example of a method embodiment of the invention, in which a company's access control system is connected to the contact information to be updated in a mobile phone.

The updating is initiated by a request signal 1 from the access control system to a central database. The request signal is in this example assumed to be from a person with the name John Smith in accordance with FIG. 2. The information that John Smith wish to update is that he will be absent until 2 o'clock $12^{th}$ Dec., 2002. The message can be written e.g. in the form "–2.00, 12.12.2002". In the central database, there is an internal database containing phonebooks of SIMs, which are thus updated whenever certain data in the central database phonebook changes. Therefore, after receiving the request, the central phone book updates its data in step 2.

To update this information also in the SIMs, the central phone book sends updating information including information about to which mobile phones the information should be sent to via the internet (by using the TCP/IP protocol) to the SMS gateway in signal 3. The SMS gateway is not technically necessary, but important in practice, since it also handles e.g. charging and other administrative tasks. The update information then proceeds to the SMS center in signal 4, where it is converted to an SMS message using the SS7 standard format for sending it to selected mobile phones (only one illustrated in FIG. 4) through the GSM network in signal 5. The mobile phone sends the update information to its SIM card in signal 6 and the SIM phone book is updated in step 7 in a way presented in FIG. 2.

Figure 5:
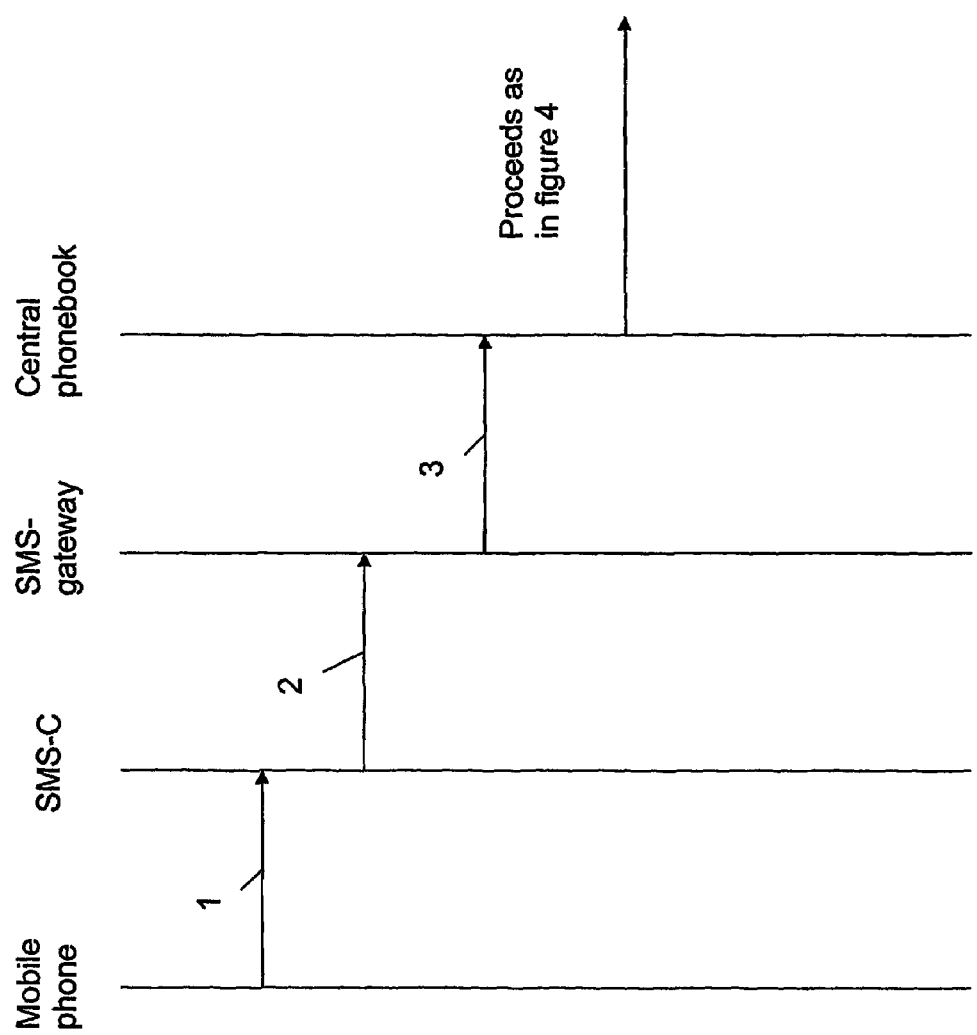
FIG. 5 is a signaling diagram of a second embodiment of the method of the invention

FIG. 5 presents an example of a method embodiment of the invention, in which SIM phonebook files are updated from a mobile phone. In this embodiment, a request to update SIM phonebook information is sent in signal 1 from a mobile phone with an SMS message to a local SMS-center handling all SMS messages in that area in the GSM network. The SMS-C converts the message and sends it in signal 2 with the TCP/IP protocol to the SMS-gateway usually handled by the operator and taking care of charging and other administrative tasks. The SMS gateway then sends the request in signal 3 to a central SIM phonebook to be updated there at first. Thereafter the process exceeds as in FIG. 4.

The invention claimed is:

1. A system for file management in a mobile network, comprising:
    a first mobile communication device or an access control system of a first user in communication with a central database, the central database having contact information related to $EF_{ADN}$ files of subscriber identity modules (SIMs);
    means for sending an update request to the central database to update contact information of the first mobile communication device stored in the central database, the contact information containing a name and additional status information of the first user;
    the central data base having routing information to a second mobile communication of a second user;
    means for conveying updated contact information from the central data base to the second mobile communication device, the updated contact information containing the name and updated additional status information;
    means for using the updated contact information to update an $EF_{ADN}$ file of a subscriber identity module (SIM) of the second mobile communication device, the $EF_{ADN}$ file being associated with the first user and containing an alpha identifier field and a dialing number field, the dialing number field containing a dialing number to the first mobile communication device of the first user, the alpha identifier field containing the name and additional status information of the first user;
    means for updating the alpha identifier field to change the additional status information to contain the updated additional status information; and
    the second communication device having means for showing the name and the updated additional status information of the first user when the name of the first user is selected from the subscriber identity module (SIM) of the second mobile communication device.

2. The system of claim 1, wherein the mobile network is a Global System of Mobile Communication (GSM).

3. The system of claim 1, wherein the central database contains Subscriber Identity module (SIM) phonebooks of subscribers in an GSM network.

4. The system of claim 1, wherein the contact information to be updated consists of time information.

5. The system of claim 4, wherein the contact information to be updated consists of place and availability information of the first user.

6. The system of claim 5 wherein the contact information to be updated consists of a code to indicate availability of the first user.

7. The system of claim 6 wherein the additional status information is embedded with the name in the alpha identifier field of the $EF_{ADN}$ file.

8. The system of claim 7 wherein the additional status information is coded to a short form to make the additional status information suitable to be embedded.

9. The system of claim 1 wherein the the system has a SMS gateway performing charging and administrative tasks.

10. A method for file management in a mobile network, comprising:
    providing a first mobile communication device in wireless communication with a second mobile communication device, the second mobile communication device having a phone book with a plurality of fields for alpha identifiers associated with dialing numbers, the phone book having a first alpha identifier field associated with a first dialing number to the first mobile communication device, the first alpha identifier field having a name and status information of a first user of the first mobile communication device;
    sending an update request to a central database to update the first alpha identifier field of the second mobile communication device, the update request containing the name and updated status information of the first user;
    the central database receiving the update request;
    the central database sending an update signal to the second mobile communication device;
    the second mobile communication device receiving the update signal;
    the update signal updating the first alpha identifier field to include the name and the undated status information of the first user; and
    a second user of the second mobile communication device activating the phone book to view the name and the updated status information prior to dialing the dialing number to the first mobile communication device.

11. The method of claim 10 wherein the update request is sent from the first mobile communication device.

* * * * *